United States Patent
Yokoyama

(10) Patent No.: US 9,313,671 B2
(45) Date of Patent: Apr. 12, 2016

(54) WIRELESS COMMUNICATION SYSTEM, BASE STATION, AND WIRELESS COMMUNICATION METHOD

(71) Applicant: FUJITSU LIMITED, Kawasaki-shi, Kanagawa (JP)

(72) Inventor: Hitoshi Yokoyama, Shinagawa (JP)

(73) Assignee: Fujitsu Limited, Kawasaki (JP)

( * ) Notice: Subject to any disclaimer, the term of this patent is extended or adjusted under 35 U.S.C. 154(b) by 88 days.

(21) Appl. No.: 13/960,376

(22) Filed: Aug. 6, 2013

(65) Prior Publication Data
US 2014/0064187 A1 Mar. 6, 2014

(30) Foreign Application Priority Data
Sep. 6, 2012 (JP) .................................. 2012-195701

(51) Int. Cl.
*H04W 24/02* (2009.01)
*H04W 28/18* (2009.01)
*H04L 1/00* (2006.01)
*H04W 28/02* (2009.01)
*H04W 52/04* (2009.01)
*H04W 72/00* (2009.01)
(Continued)

(52) U.S. Cl.
CPC .............. *H04W 24/02* (2013.01); *H04W 28/18* (2013.01); *H04L 1/0002* (2013.01); *H04L 1/0003* (2013.01); *H04L 1/0009* (2013.01); *H04W 28/0273* (2013.01); *H04W 52/04* (2013.01); *H04W 52/20* (2013.01); *H04W 52/262* (2013.01); *H04W 52/267* (2013.01); *H04W 72/00* (2013.01)

(58) Field of Classification Search
CPC ..... H04W 24/02; H04W 52/04; H04W 72/00; H04W 28/0273; H04L 1/0002; H04L 1/0003; H04L 1/0009
USPC ................................. 370/328, 231, 351, 389
See application file for complete search history.

(56) References Cited

U.S. PATENT DOCUMENTS

| 7,502,340 B1* | 3/2009 | Chuang ................. H04L 1/0003 370/318 |
| 7,864,802 B1* | 1/2011 | Dehkordi .............. H04W 28/22 370/468 |
| 8,340,586 B2* | 12/2012 | Wellington ........... H04W 24/04 370/235 |

(Continued)

FOREIGN PATENT DOCUMENTS

| JP | 2010-273050 A | 12/2010 |
| JP | 2011-061464 A | 3/2011 |

OTHER PUBLICATIONS

Padhye et al., Modeling TCP Reno Performance: A Simple Model and Its Empirical Validation, Apr. 2000, IEEE/ACM Transactions on Networking, vol. 8, No. 2, pp. 133-145.*

(Continued)

*Primary Examiner* — Chi H Pham
*Assistant Examiner* — Shailendra Kumar
(74) *Attorney, Agent, or Firm* — Arent Fox LLP

(57) ABSTRACT

A wireless communication system including: a terminal, and a base station including an antenna configured to perform wireless communication with the terminal, and a processor configured to perform, when a difference between a first throughput at a radio layer for the wireless communication and a second throughput at an upper layer to the radio layer for the wireless communication is larger than a given value, a processing to decrease errors at a radio layer for the wireless communication.

14 Claims, 17 Drawing Sheets

(51) Int. Cl.
*H04W 52/20* (2009.01)
*H04W 52/26* (2009.01)

(56) References Cited

U.S. PATENT DOCUMENTS

| | | | |
|---|---|---|---|
| 2005/0025090 A1* | 2/2005 | Klein et al. | 370/328 |
| 2007/0104129 A1* | 5/2007 | Yang | H04L 1/0003 370/329 |
| 2009/0034449 A1* | 2/2009 | Kong et al. | 370/320 |
| 2011/0007790 A1* | 1/2011 | Xu et al. | 375/225 |
| 2011/0059691 A1 | 3/2011 | Hegge | |
| 2011/0194490 A1* | 8/2011 | Gandham et al. | 370/328 |
| 2014/0010209 A1* | 1/2014 | Hakola et al. | 370/336 |

OTHER PUBLICATIONS

Constantine et al., Framework for TCP Throughput Testing, Aug. 2011, Internet Engineering Task Force (IETF), RFC 6349.*

* cited by examiner

FIG. 7

| TRANSMISSION POWER | WIRELESS ERROR RATE | PHY THROUGHPUT CALCULATED FROM WIRELESS ERROR RATE | RETRANSMISSION DELAY (AVERAGE) | TCP THROUGHPUT |
|---|---|---|---|---|
| 10dBM | 15% | 111Mbps | 1.56ms | 92.1Mbps |
| 11dBM | 10% | 117Mbps | 0.96ms | 103Mbps |
| 12dBM | 3% | 126Mbps | 0.25ms | 120Mbps |
| 13dBM | 0% | 130Mbps | 0ms | 128Mbps |

FIG. 9

| MCS | WIRELESS ERROR RATE | PHY THROUGHPUT CALCULATED FROM WIRELESS ERROR RATE | RETRANSMISSION DELAY (AVERAGE) | TCP THROUGHPUT |
|---|---|---|---|---|
| 64QAM,R=0.75 | 20% | 112Mbps | 2.24ms | 82.1Mbps |
| 64QAM,R=0.69 | 15% | 110Mbps | 1.56ms | 92.1Mbps |
| 64QAM,R=0.62 | 10% | 104Mbps | 0.96ms | 103Mbps |
| 64QAM,R=0.54 | 0% | 100Mbps | 0ms | 100Mbps |

FIG. 13

| WIRELESS ERROR RATE | DELAY (AVERAGE) |
|---|---|
| 30% | 7.32ms |
| 25% | 6.63ms |
| 20% | 5.99ms |
| 15% | 5.41ms |
| 10% | 4.89ms |
| 5% | 4.42ms |
| 0% | 4ms |

WIRELESS COMMUNICATION SYSTEM, BASE STATION, AND WIRELESS COMMUNICATION METHOD

CROSS-REFERENCE TO RELATED APPLICATION

This application is based upon and claims the benefit of priority of the prior Japanese Patent Application No. 2012-195701, filed on Sep. 6, 2012, the entire contents of which are incorporated herein by reference.

FIELD

The embodiment discussed herein is related to a wireless communication system, a base station, and a wireless communication method.

BACKGROUND

In a wireless communication system, as a wireless terminal moves, the wireless propagation environment changes, and therefore the quality of wireless communication greatly varies. To address this, stabilization in wireless communication is sought by using error correction techniques, such as turbo coding, and retransmission techniques, such as automatic repeat request (ARQ) and hybrid ARQ (HARQ).

In addition, wireless communication at approximately 10 Mbps or more is being achieved by using high-speed packet access (HSPA), which extends wideband code division multiple access (W-CDMA), and so forth.

Further, wireless communication from about 150 Mbps to about 300 Mbps is being realized by using long term evolution (LTE), which has begun to be commercialized, and LTE-advanced (LTE-A), which is a standard that extends LTE.

Note that Japanese Laid-open Patent Publication No. 2011-061464, which is an example of related art technologies for wireless communication, discloses a method in which a base station controls the communication rate of a wireless link so as to reduce the difference between the communication rate of the wireless link and the communication rate of a backhaul link, thereby inhibiting interference and reducing delay in data transfer.

Also, Japanese Laid-open Patent Publication No. 2010-273050 discloses a method of controlling transmission of packets so as to satisfy certain conditions under which it is possible to enhance transmission probability, when packet retransmission to a mobile station has failed a given successive number of times. The method thereby improves the transmission control protocol (TCP) throughput.

SUMMARY

According to an aspect of the invention, a wireless communication system includes a terminal, and a base station including an antenna configured to perform wireless communication with the terminal, and a processor configured to perform, when a difference between a first throughput at a radio layer for the wireless communication and a second throughput at an upper layer to the radio layer for the wireless communication is larger than a given value, a processing to decrease errors at a radio layer for the wireless communication.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a table depicting an example relationship among the transmission power, the wireless error rate, the PHY throughput, the retransmission delay, and the TCP throughput;

FIG. 9 is a table depicting an example relationship among the MCS, the wireless error rate, the PHY throughput, the retransmission delay, and the TCP throughput;

FIG. 13 is a table depicting an example relationship between the wireless error rate and the round trip time;

DESCRIPTION OF EMBODIMENT

For example, there is a wireless communication system that includes a wireless terminal, a wireless base station capable of wirelessly communicating with the wireless terminal, and a communication device, such as a contents server, which is connected by wiring that runs through a network, such as the Internet, to the wireless base station.

In such a wireless communication system, when communication is performed between a wireless terminal and a communication device, such as a contents server, a data error (hereinafter referred to simply as a "wireless error") or a data loss sometimes occurs in the wireless propagation path between the wireless base station and the wireless terminal.

In this case, the recipient of a radio signal is not able to demodulate and decode data having a wireless error into normal data, and the transmitter of the radio signal retransmits the data.

However, a delay associated with control of data retransmission sometimes significantly reduces the throughput at an upper layer to a radio layer. Such a condition is not considered in the above examples of the related art.

A purpose of the present disclosure is to efficiently suppress a reduction in the throughput at the upper layer in a wireless communication system.

Another aspect of the present disclosure is to efficiently utilize wireless resources.

It is noted that, as well as the above aspects, attaining effects that are derived from configurations illustrated in the forms for carrying out the present disclosure, which will be described later, and that are not obtained from the related art technologies may be positioned as one of other aspects of the present disclosure.

Hereinafter, an embodiment of the present disclosure will be described with reference to the drawings. The embodiment and modifications described hereinafter, however, are merely illustrative and are not meant to exclude various modifications and applications of technologies that will not be explicitly pointed out. In other words, the embodiment and modifications illustrated hereinafter may be carried out in various modified ways without departing from the spirit and scope of the present disclosure.

[1] Embodiment (1.1) Example Configuration of Wireless Communication System

Figure 1:
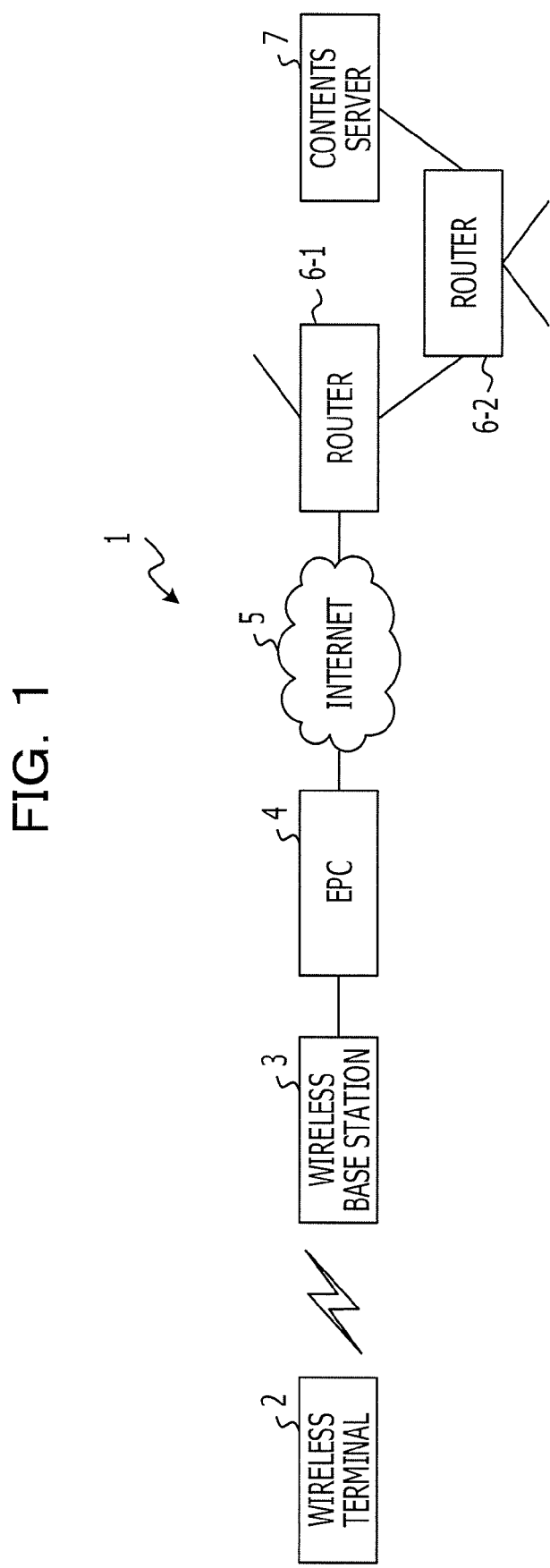
FIG. 1 is a diagram depicting an example configuration of a wireless communication system according to one embodiment.

FIG. 1 is a diagram depicting an example configuration of a wireless communication system according to an embodiment.

A wireless communication system 1 depicted in FIG. 1 includes for example a wireless terminal 2, which is an example of a user terminal (UE), a wireless base station 3, an evolved packet core (EPC) 4, which is an example of a core network, the Internet 5, routers 6-1 and 6-2, and a contents server 7. Note that the wireless terminal 2, the wireless base station 3, the router 6-1 and 6-2, and the contents server 7 are not limited to the number illustrated in FIG. 1.

The wireless terminal 2 has a function of wirelessly communicating with the wireless base station 3.

Additionally, the wireless base station 3 provides a wireless area, such as a cell or sector, and has a function of wirelessly communicating with the wireless terminal 4 through the wireless area.

Moreover, the EPC 4 has a function of controlling a control plane (C-plane) and a user plane (U-plane).

For this reason, the EPC 4 includes a mobility management entity (MME) that controls the C-plane, a serving gateway (S-GW) that controls the U-plane, and a packet data network gateway (P-GW) that controls connection to an external network such as the Internet 5. The MME, S-GW, and P-GW are not depicted.

The routers 6-1 and 6-2 perform routing of data. In the example depicted in FIG. 1, data transmitted and received between the Internet 5 and the contents server 7 is routed by the routers 6-1 and 6-2.

The contents server 7 provides contents, such as animations, sounds, and web data. Contents transmitted from the contents server 7 are distributed through the routers 6-2 and 6-1, the Internet 5, the EPC 4, and the wireless base station 3 to the wireless terminal 2.

In the wireless communication system 1, if the wireless environment is good, it is assumed that the wireless terminal 2 is capable of wirelessly communicating with the wireless base station 3 at a communication rate of 130 Mbps. In contrast, it is assumed that a line that permits communication at a communication rate of 1 Gbps, for example, is arranged between the wireless base station 3 and the contents server 7.

Figure 2:
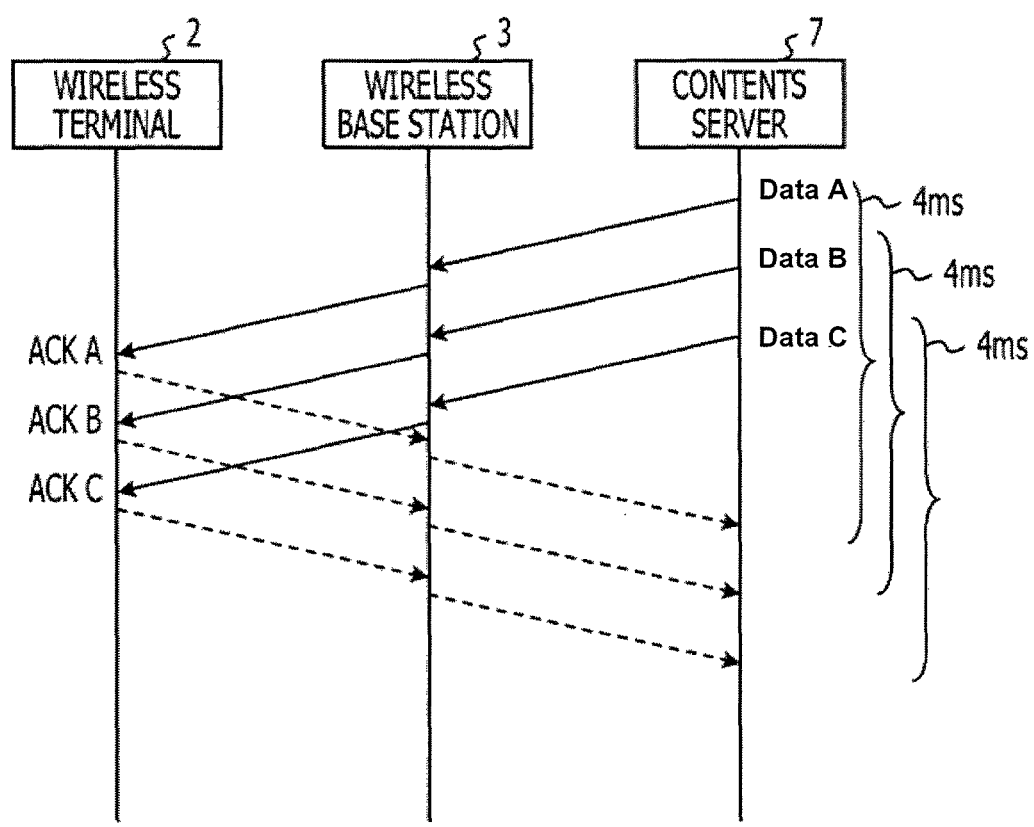
FIG. 2 depicts example data Communication between a wireless terminal and a contents server depicted in FIG. 1.

Here, FIG. 2 depicts an example of data communication in the wireless communication system 1.

In the example depicted in FIG. 2, data A, data B, and data C transmitted from the contents server 7 in a downlink (DL) direction pass through the wireless base station 3 and are received by the wireless terminal 2 (refer to solid-line arrows in FIG. 2).

Then, if the wireless terminal 2 has successfully received the data A, the data B, and the data C, the wireless terminal 2 returns an acknowledgement (ACK) a, an ACK B, and an ACK C, which indicate that the data A, data B, and data C have been successfully received, respectively, in the uplink (UL) direction.

The ACK A, the ACK B, and the ACK C transmitted from the wireless terminal 2 pass through the wireless base station 3 and are received by the contents server 7 (refer to dotted-line arrows in FIG. 2).

In the example depicted in FIG. 2, the amount of time (RTT: round trip time) from a time point at which each of the data A, the data B, and the data C is transmitted to a time point at which each of the ACK A, the ACK B, and the ACK C is received is 4 ms.

At this point, if for TCP window control between the wireless terminal 2 and the contents server 7 the window size is 64 kB, the upper limit of the TCP throughput between the wireless terminal 2 and the contents server 7 is 128 Mbps, which is given by the following equation (1).

$$\text{Upper limit of TCP throughput [Mbps]} = \text{window size [kB]} \times 8/\text{RTT [ms]} \quad (1)$$

Figure 3:
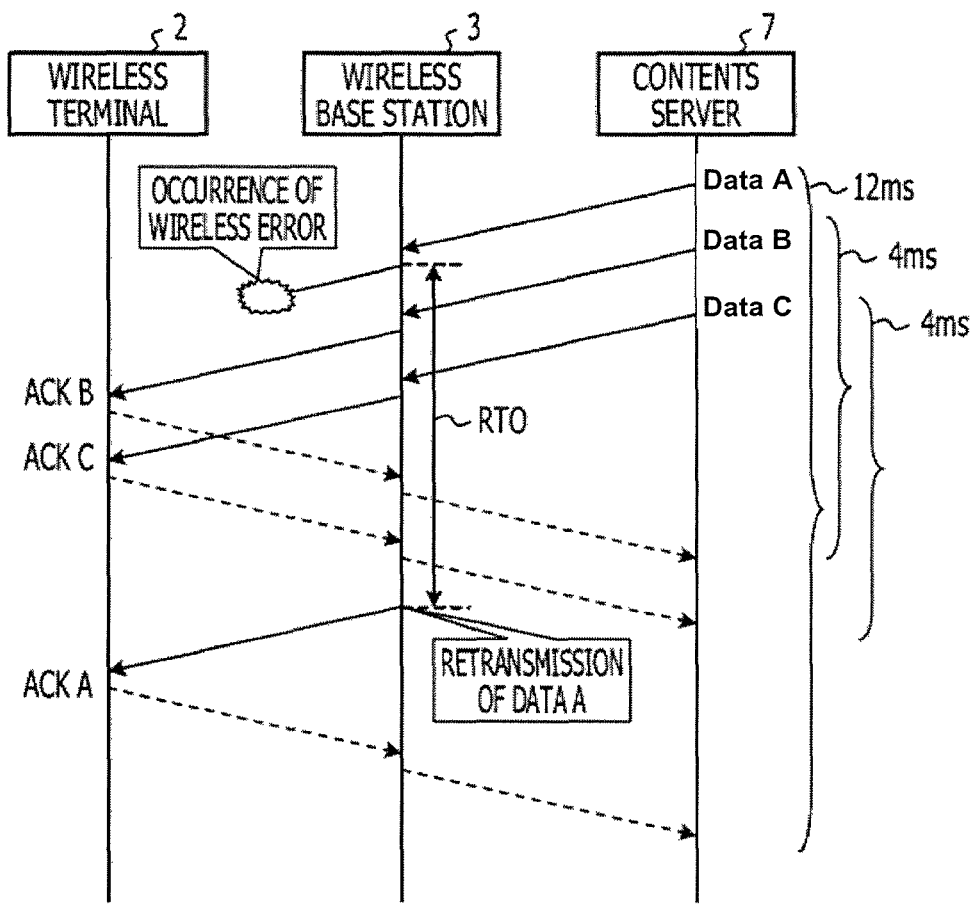
FIG. 3 depicts example data Communication between the wireless terminal and the contents server depicted in FIG. 1.

In contrast, as illustrated in FIG. 3, the data A transmitted from the contents server 7 sometimes does not arrive at the wireless terminal 2 because a wireless error occurs between the wireless base station 3 and the wireless terminal 2.

If the data A is not received by the wireless terminal 2, the wireless base station 3 cannot receive the ACK A corresponding to the data A from the wireless terminal 2.

To address this, if the wireless base station 3 cannot receive the ACK A corresponding to the data A when a given retransmission timeout (RTO) elapses after transmission of the data A, the wireless base station 3 retransmits the data A to the wireless terminal 2.

Alternatively, if the data A transmitted from the contents server 7 has not been successfully received by the wireless terminal 2 because of a wireless error occurring between the wireless base station 3 and the wireless terminal 2, the wireless base station 3 receives a negative ACK (NACK) A indicating that the wireless terminal 2 has not successfully received the data A. Then, in response to the receipt of the NACK A, the wireless base station 3 retransmits the data A to the wireless terminal 2.

In either case, however, if data is retransmitted, a delay due to data retransmission occurs. For example, the amount of time (RTT) from a time point at which the data A is transmitted from the contents server 17 to a time point at which the ACK A is received by the contents server 17 is 12 ms.

Here, when the RTT is 12 ms, the upper limit of the TCP throughput between the wireless terminal 2 and the contents server 7 is calculated to be about 42.67 Mbps, which is given by the above equation (1).

In other words, data retransmission between the wireless base station 3 and the wireless terminal 2 delays a delivery check for transmission data. Therefore, transmission data in a transmission buffer in the contents server 7 is retained. As a result, the data transmission from the contents server 7 is delayed, and the TCP throughput significantly decreases. Note that such a phenomenon may be referred to as a frozen TCP window.

For example, when the wireless terminal 2 is able to wirelessly communicate with the wireless base station 3 at a communication rate of 130 Mbps, if the possibility that a wireless error occurs between the wireless terminal 2 and the wireless base station 3 is 10%, a transmission rate of 130 Mbps×(100−10) %=117 Mbps is to be expected.

However, retransmission of data due to a wireless error occurs, frozen TCP windows as mentioned above causes the TCP throughput to be only about 42.67 Mbps, which is lower than an expected transmission rate of 117 Mbps by about 60%.

To address this, with this wireless communication system 1, a method to efficiently suppress a reduction in the throughput at an upper layer to the radio layer, such as the TCP throughput, is proposed.

Specifically speaking, when data retransmission due to a wireless error occurs, control that reduces the wireless error rate is performed, on the basis of both the throughput at the upper layer as well as a communication rate (the throughput at the radio layer) expected from the wireless communication rate and the wireless error rate.

Accordingly, it is possible to efficiently suppress a reduction in the throughput of the upper layer. Additionally, since it is possible to efficiently suppress a reduction in the throughput of the upper layer, it becomes possible to more efficiently utilize wireless resources.

(1.2) Example Configuration of Wireless Terminal 2

Figure 4:
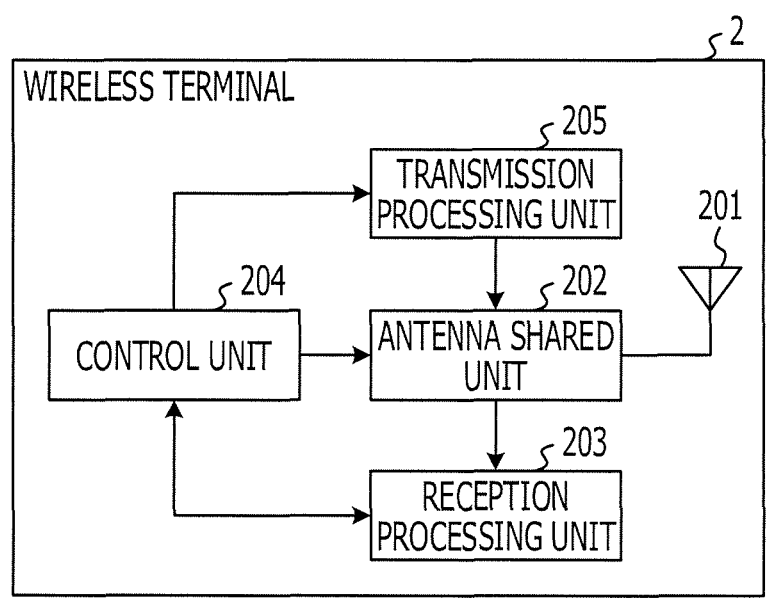
FIG. 4 is a diagram depicting an example configuration of the wireless terminal depicted in FIG. 1.

FIG. 4 is a diagram depicting an example configuration of the wireless terminal 2.

The wireless terminal 2 depicted in FIG. 4 includes, for example, an antenna 201, an antenna sharing unit 202, a reception processing unit 203, a control unit 204, and a transmission processing unit 205.

The antenna 201 transmits and receives radio signals to and from the wireless base station 3, which provides a wireless area, such as a cell, in which the wireless terminal 2 is located. The antenna 201 may indirectly, by means of a repeater that relays radio signals, transmit and receive radio signals to and from another wireless base station 3 different from the base station 3 providing a wireless area, such as a cell, in which the wireless terminal 2 is located.

In other words, the antenna 201 may function as an example of a wireless unit that wirelessly communicates with the wireless base station 3.

The antenna sharing unit 202 is a device that switches between transmission and reception functions at the antenna 201. Note that, when the wireless terminal 2 includes a separate transmission antenna and a separate reception antenna instead of the antenna 201, the antenna sharing unit 202 is omitted.

The reception processing unit 203 performs given wireless reception processing on a radio signal received by the antenna 201. The wireless reception processing includes processing such as low-noise amplification, frequency conversion to a baseband frequency (down conversion), and analog-to-digital (A/D) conversion of the received radio signal.

The transmission processing unit 205 performs given wireless transmission processing on a radio signal to be transmitted by the antenna 201. The wireless transmission processing includes processing such as digital-to-analog (D/A) conversion, frequency conversion to radio frequency (up conversion), and power amplification.

The control unit 204 controls the operations of the antenna sharing unit 202, the reception processing unit 203, and the transmission processing unit 205. The control unit 204 is capable of generating UL data to be transmitted from the antenna 201, and providing DL data received by the antenna 201 and the reception processing unit 203 to various application processing units (not depicted).

(1.3) Example Configuration of Wireless Base Station 3

Figure 5:
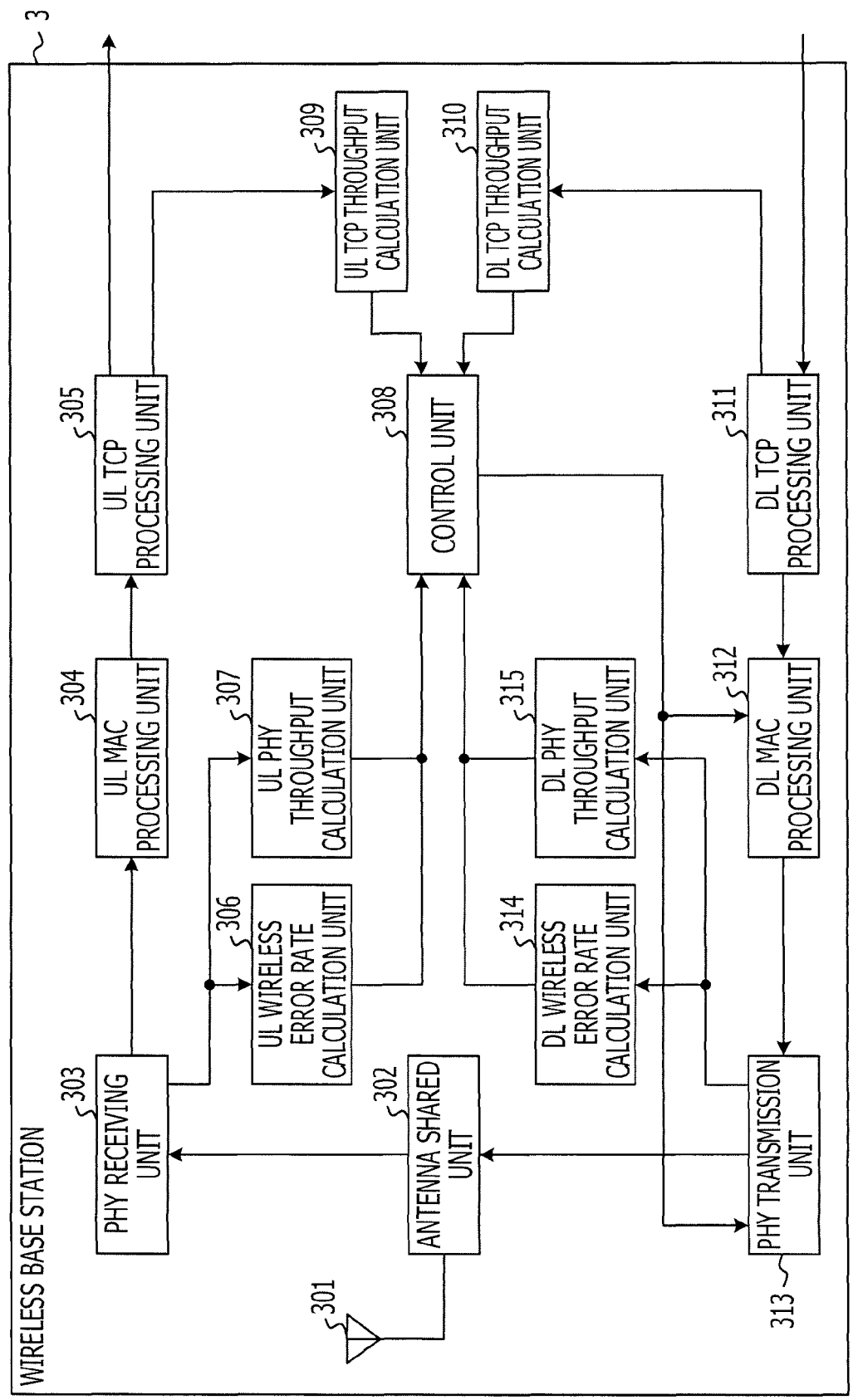
FIG. 5 is a diagram depicting an example configuration of a wireless base station depicted in FIG. 1.

FIG. 5 is a diagram depicting an example configuration of the wireless base station 3.

The wireless base station 3 depicted in FIG. 5 for example includes an antenna 301, an antenna sharing unit 302, a PHY receiving unit 303, a UL media access control (MAC) processing unit 304, a UL TCP processing unit 305, a UL wireless error rate calculation unit 306, a UL PHY throughput calculation unit 307, a control unit 308, and a UL TCP throughput calculation unit 309. Additionally, the wireless base station 3 depicted in FIG. 5 for example includes a DL TCP throughput calculation unit 310, a DL TCP processing unit 311, a DL MAC processing unit 312, a PHY transmission unit 313, a DL wireless error rate calculation unit 314, and a DL PHY throughput calculation unit 315.

The antenna 301 transmits and receives radio signals to and from the wireless terminal 2, which is located within a wireless area, such as a cell, provided by the wireless base station 3. The antenna 301 may indirectly transmit and receive radio signals to and from the wireless terminal 2 located outside the range of the wireless area, such as a cell, provided by the wireless base station 3, through a repeater that relays radio signals, and the like.

In other words, the antenna 301 may function as an example of a wireless unit that wirelessly communicates with the wireless terminal 2.

The antenna sharing unit 302 is a device that switches between transmission and reception functions at the antenna 201. Note that, when the wireless base station 3 includes a separate transmission antenna and a separate reception antenna instead of the antenna 301, the antenna sharing unit 302 is omitted.

The PHY receiving unit 303 performs given wireless (layer 1 (PHY: physical layer)) reception processing on a UL radio signal received by the antenna 301. The wireless reception processing includes processing such as low-noise amplification, frequency conversion to a baseband frequency (down conversion), A/D conversion, decoding, and demodulation of the received radio signal. After being subjected to the given wireless reception processing by the PHY receiving unit 303, the signal is transmitted to the MAC processing unit 304.

The UL MAC processing unit 304 performs given layer 2 (MAC) processing on the signal, which has been subjected to the given wireless reception processing by the PHY receiving unit 303.

After being subjected to the given MAC processing by the UL MAC processing unit 304, the signal is transmitted to the UL TCP processing unit 305.

The UL TCP processing unit 305 performs given layer 3 (TCP) processing on the signal, which has been subjected to the given MAC processing by the UL MAC processing unit 304. After being subjected to the given TCP processing by the UL TCP processing unit 305, the signal is transmitted to the EPC 4 and the Internet 5 on the upper network.

The UL wireless error rate calculation unit 306 counts both the number of times the signal has been successfully demodulated by the PHY receiving unit 303 and the number of times information is not successfully demodulated, and calculates the wireless error rate in the UL on the basis of the results of counting. The control unit 308 is notified of the wireless error rate in the UL, which is calculated by the UL wireless error rate calculation unit 306.

The UL PHY throughput calculation unit 307 calculates the wireless throughput (UL PHY throughput) in the UL on the basis of the amount of information about a signal successfully demodulated by the PHY receiving unit 303, and the amount of time over which the signal was received. Here, the UL PHY throughput given when the wireless error rate in the UL is n % (0≤n≤100) has a value obtained by multiplying the UL PHY throughput given when the wireless error rate in the UL is 0% by (100−n) %. The control unit 308 is notified of the UL PHY throughput, which is calculated by the UL PHY throughput calculation unit 307.

The UL TCP throughput calculation unit 309 calculates the throughput of a TCP signal to the upper network on the basis of the amount of information for a layer 3 signal, such as a signal made up of IP packets, successfully restored by the UL TCP processing unit 305 and the amount of time over which is signal is received. The control unit 308 is notified of the UL TCP throughput, which is calculated by the UL TCP throughput calculation unit 309.

The DL TCP processing unit 311 receives a layer 3 signal, such as a signal made up of IP packets, from the upper network, and performs given layer 3 (TCP) processing on the received signal. After being subjected to the given TCP processing by the DL TCP processing unit 311, the signal is transmitted to the DL MAC processing unit 312.

The DL TCP throughput calculation unit 310 calculates the throughput of a TCP signal (DL TCP throughput) from the upper network on the basis of the amount of information about a layer 3 signal, such as a signal made up of IP packets, normally restored by the DL TCP processing unit 311 and the amount of time over which the signal is received.

The control unit 308 is notified of the DL TCP throughput, which is calculated by the DL TCP throughput calculation unit 310.

The DL MAC processing unit 312 performs given MAC processing on the signal, which has been subjected to the given TCP processing by the DL TCP processing unit 311. After being subjected to the given MAC processing by the DL MAC processing unit 312, the signal is transmitted to the PHY transmission unit 313.

The PHY transmission unit 313 performs given wireless (layer 1 (PHY)) transmission processing on a DL radio signal to be transmitted by the antenna 301. The wireless transmission processing includes processing such as D/A conversion, frequency conversion to radio frequencies (up conversion), and power amplification, and processing such as encoding and modulation. Additionally, the PHY transmission unit 313 performs a delivery check on whether the radio signal transmitted from the antenna 301 has been successfully received by the wireless terminal 2.

The DL wireless error rate calculation unit 314 counts the number of times a signal is successfully demodulated in the wireless terminal 2 and the number of times information is not successfully demodulated, from among the radio signals transmitted by the PHY transmission unit 313, and calculates the wireless error rate in the DL on the basis of the counting results. The control unit 308 is notified of the wireless error rate in the DL, which is calculated by the DL wireless error rate calculation unit 314.

The DL PHY throughput calculation unit 315 calculates the wireless throughput in the DL (DL PHY throughput) on the basis of the amount of information about a signal successfully demodulated in the wireless terminal 2, out of radio signals transmitted by the PHY transmission unit 313, and the and the amount of time over which the signal was transmitted. Here, the DL PHY throughput, given when the wireless error rate in the DL is m % (0≤m≤100), has a value obtained by multiplying the DL PHY throughput given when the wireless error rate in the DL is 0% by (100−m) %. The control unit 308 is notified of the DL PHY throughput, which is calculated by the DL PHY throughput calculation unit 315.

The control unit 308 has a function of managing a wireless terminal 2 that wirelessly communicates with the wireless base station 3.

The control unit 308 is capable of performing control so as to change various parameters for wireless communication in each of the UL and DL. Examples of the various parameters include transmission power, the encoding scheme for UL radio signals, the method for modulating UL radio signals in the wireless terminal 2, as well as transmission power, the encoding scheme for DL radio signals, and the method for modulating DL radio signals in the wireless base station 3. Here, the transmission power, the encoding scheme for UL radio signals, and the method for modulating UL radio signals in the wireless terminal 2 may be changed by the wireless base station 3 transmitting a control signal to the wireless terminal 2.

Moreover, the control unit 308 is capable of performing control to change the above various parameters on the basis of information notified from the UL wireless error rate calculation unit 306, the UL PHY throughput calculation unit 307, the UL TCP throughput calculation unit 309, the DL wireless error rate calculation unit 314, the DL PHY throughput calculation unit 315, and the DL TCP throughput calculation unit 310.

Specifically, for example, the wireless base station 3 measures values indicating quality (or performance) on the wireless side, such as the wireless error rate in the DL and the DL PHY throughput, and acquires values indicating quality (or performance) on the wired side, such as the DL TCP throughput. The wireless base station 3 then determines whether wireless errors in wireless communication, which is the lower layer, have significantly affected the TCP throughput in the upper layer, and performs control on the basis of the result of the determination so as to change the above various parameters. Thereby, reduction of the DL TCP throughput may be efficiently suppressed.

Additionally, for example, the wireless base station 3 measures values indicating the quality of wireless communication, such as the wireless error rate in the UL and the UL PHY throughput, and acquires values indicating the quality for wired communication, such as the UL TCP throughput. The wireless base station 3 then determines whether wireless errors in wireless communication, which is the lower layer, have significantly affected the TCP throughput on the upper layer, and performs control on the basis of the result of the determination so as to change the above various parameters. Thereby, reduction of the UL TCP throughput may be efficiently suppressed.

In other words, the control unit 308 may function as an example of a processing unit that performs control so as to decrease the rate of occurrence of wireless errors, when wireless errors occur in the wireless communication and the throughput at an upper layer to the radio layer is smaller than the throughput at the radio layer, which is calculated on the basis of the rate of occurrence of wireless errors.

(1.4) Example of Operations of Wireless Communication System 1

Figure 6:
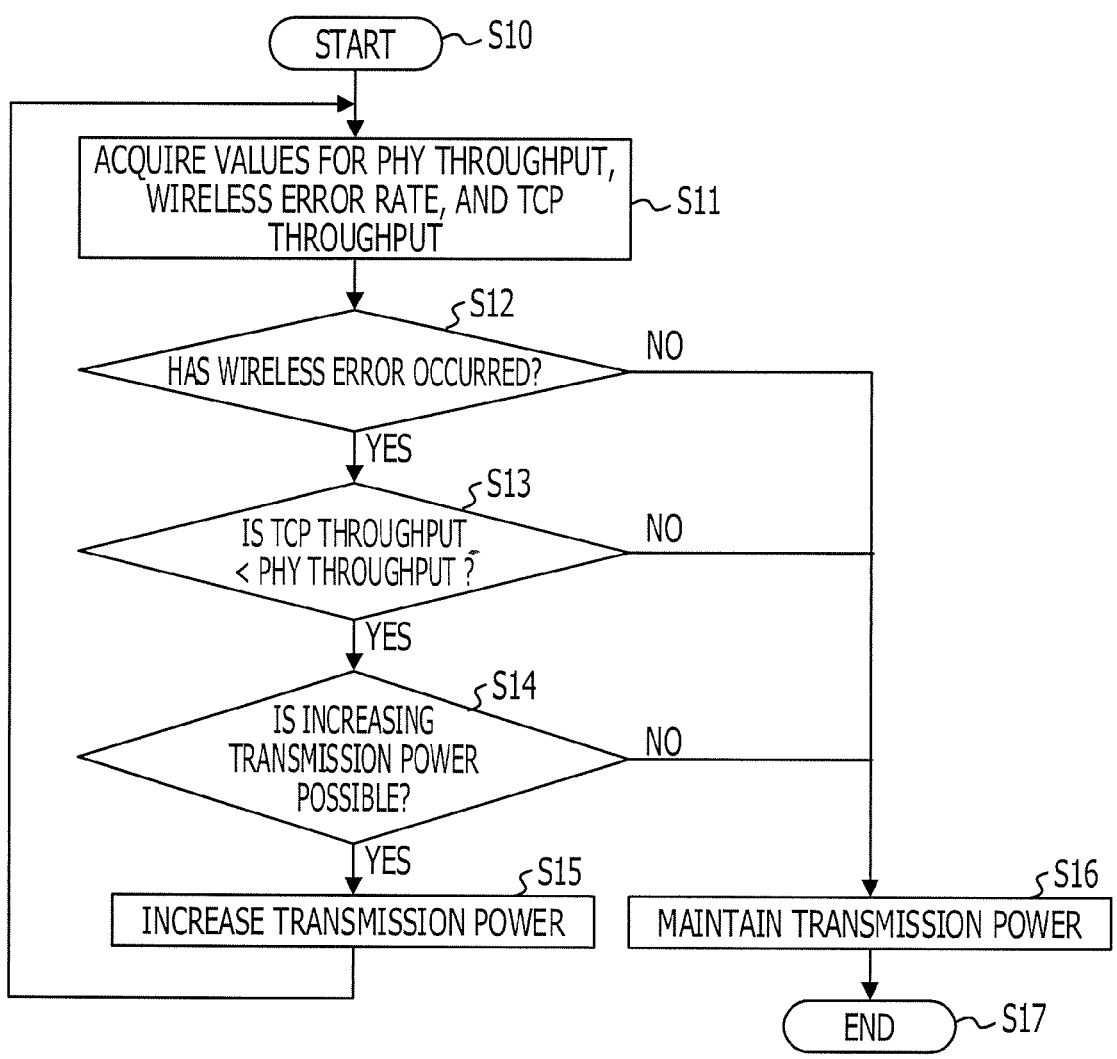
FIG. 6 is a flowchart depicting an example communication control method according to one embodiment.

FIG. 6 is a flowchart depicting an example of operations of the wireless communication system 1. Although a process focused on the DL direction will be described as an example hereinafter, the process may be practiced similarly for the UL direction.

As illustrated in FIG. 6, upon starting the process at a regular or irregular time (S10), the wireless base station 3 acquires the values of the DL PHY throughput, the wireless error rate in the DL, and the DL TCP throughput first (S11).

Then, the wireless base station 3 determines whether a wireless error has occurred in a wireless communication path between the wireless base station 3 and the wireless terminal 2 (S12). Whether a wireless error has occurred in the wireless communication path between the wireless base station 3 and the wireless terminal 2 may be determined on the basis of, for example, the elapsing of a RTO, the reception of an NACK, the wireless error rate in the DL, the wireless error rate in the UL, and the like.

If it is determined that a wireless error has occurred in the wireless communication path between the wireless base station 3 and the wireless terminal 2 (Yes in S12), then the wireless base station 3 determines whether the TCP throughput is smaller than the PHY throughput (S13). Note that, in S13, after considering information, such as the amount of time to process the TCP header, the wireless base station 3 may determine whether the value obtained by multiplying the TCP throughput by a header margin is smaller than the value of the PHY throughput.

That is, the header margin represents a margin for the header added between the PHY layer and the TCP layer. Regarding the value of the header margin, a suitable value may be applied to each type of the wireless communication system 1. For example, 1.05 may be used as the value of the header margin.

Here, if it is determined that the TCP throughput is smaller than the PHY throughput (Yes in S13), the wireless base station 3 determines whether it is possible to increase the transmission power of the wireless base station 3 (S14).

Then, if it is determined that it is possible to increase the transmission power of the wireless base station 3 (Yes in S14), the wireless base station 3 controls the transmission power of the wireless base station 3 so that the transmission power increases (S15), thereby reducing the occurrence of wireless errors in the wireless communication path between the wireless base station 3 and the wireless terminal 2.

The operations in the above steps S11 to S15 are repeatedly performed by the wireless base station 3 until it is determined that a wireless error has not occurred in the wireless communication path between the wireless base station 3 and the wireless terminal 2 (No in S12), it is determined that the TCP throughput is greater than or equal to the PHY throughput (No in S13), or it is determined that resources are tight and increasing the transmission power of the wireless base station 3 is not possible (No in S14).

That is, if it is determined that a wireless error has not occurred in the wireless communication path between the wireless base station 3 and the wireless terminal 2 (No in S12), if it is determined that the TCP throughput is greater than or equal to the PHY throughput (No in S13), or if it is determined that resources are tight and increasing the transmission power of the wireless base station 3 is not possible (No in S14), the wireless base station 3 performs control so as to maintain the current transmission power (S16) and then the process described above ends (S17).

Here, FIG. 7 depicts an example result of the above process.

As illustrated in FIG. 7, for example, in the initial state, the transmission power of the wireless base station 3 is 10 dBm, the wireless error rate is 15%, the PHY throughput calculated on the basis of the wireless error rate in the DL is 111 Mbps, the delay caused by retransmission that has occurred within a given receiving period of time is 1.56 ms, and the DL TCP throughput is 92.1 Mbps.

Here, when the wireless base station 3 increases the transmission power by 1 dBm in S15, the transmission power of the wireless base station 3 is changed to 11 dBm, the wireless error rate is changed to 10%, the PHY throughput calculated on the basis of the wireless error rate in the DL is changed to 117 Mbps, the delay caused by retransmission that occurred within the given receiving period of time is changed to 0.96 ms, and the DL TCP throughput is changed to 103 Mbps.

Additionally, upon repeating the above operations, the transmission power of the wireless base station 3 is changed to 12 dBm, the wireless error rate is changed to 3%, the PHY throughput calculated on the basis of the wireless error rate in the DL is changed to 126 Mbps, the delay caused by retransmission that has occurred within the given receiving period of time is changed to 0.25 ms, and the DL TCP throughput is changed to 120 Mbps. Finally, the transmission power of the wireless base station 3 is 13 dBm, the wireless error rate is 0%, the PHY throughput calculated on the basis of the wireless error rate in the DL is 130 Mbps, the delay caused by retransmission that has occurred within the given receiving period of time is 0 ms, and the DL TCP throughput is 128 Mbps.

According to the embodiment, the situation where the occurrence of wireless errors significantly reduces the throughput at an upper layer may be avoided, so that the reduction of the TCP throughput at the upper layer is efficiently suppressed. For example, the above control is particularly effective if the throughput at the TCP layer, which has decreased because of a wireless error, is smaller than the throughput on the wireless side (PHY throughput).

Additionally, when the reduction of the throughput at an upper layer is able to be reliably alleviated, control of wireless resources is performed so that the wireless error rate is caused to be reduced, thereby enabling effective usage of wireless resources.

[2] First Modification

In the embodiment described above, the wireless base station 3 performs control to increase the transmission power of the wireless base station 3 in order to reduce the wireless error rate. The wireless base station 3, however, may reduce the wireless error rate by changing at least one of the code rate of data and the modulation method.

Figure 8:
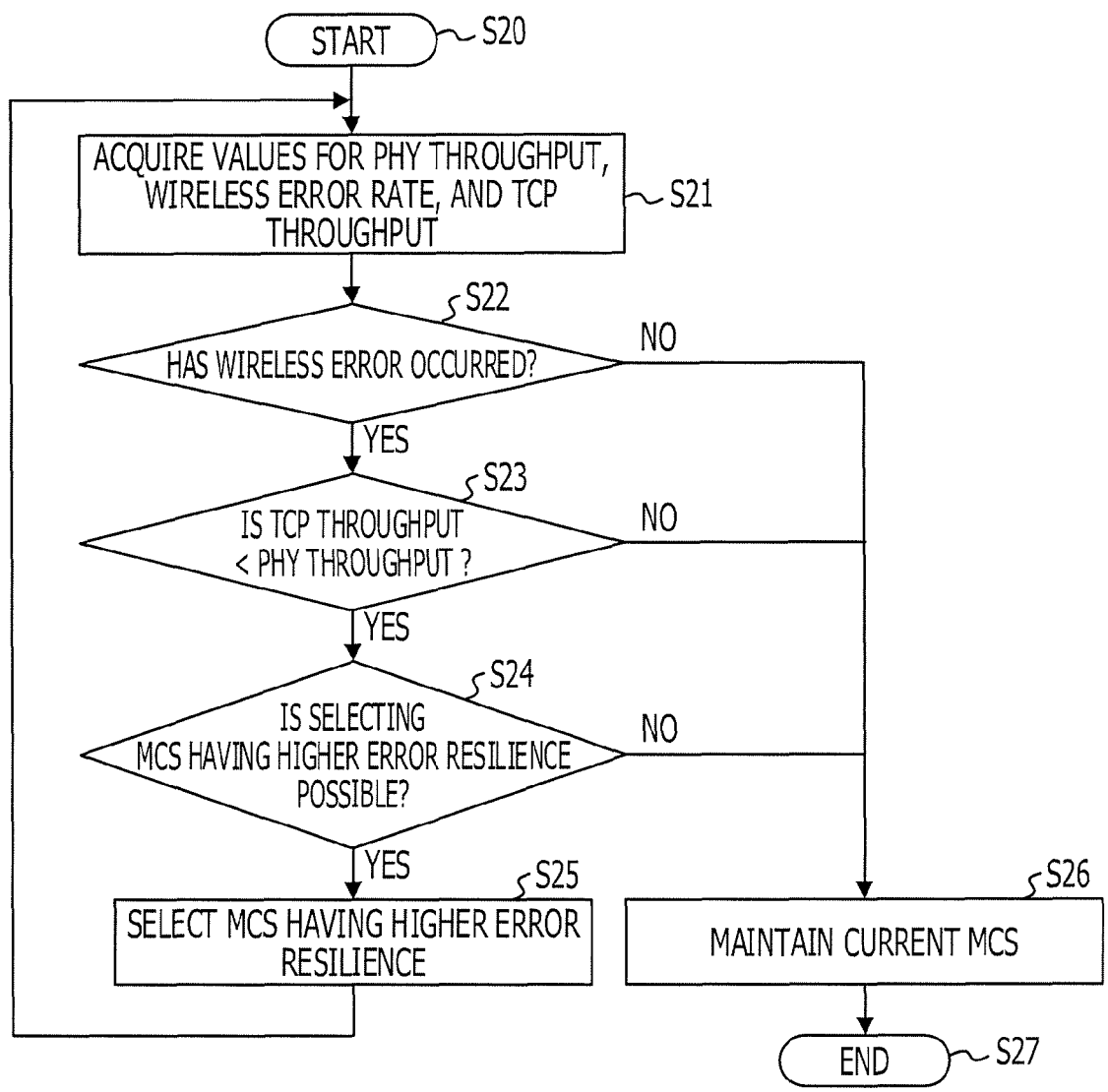
FIG. 8 is a flowchart depicting an example communication control method according to a first modification.

FIG. 8 is a flowchart depicting an example of operations of the wireless communication system 1. Note that although a process focused on the DL direction will be described by example hereinafter, the process may be practiced similarly for the UL direction.

As illustrated in FIG. 8, upon starting the process at a regular or irregular time (S20), the wireless base station 3 first acquires the values of the DL PHY throughput, the wireless error rate in the DL, and the DL TCP throughput (S21).

Then, the wireless base station 3 determines whether a wireless error has occurred in the wireless communication path between the wireless base station 3 and the wireless terminal 2 (S22). Note that whether a wireless error has occurred in the wireless communication path between the wireless base station 3 and the wireless terminal 2 may be determined on the basis of the wireless error rate in the DL or the wireless error rate in the UL.

If it is determined that a wireless error has occurred in the wireless communication path between the wireless base station 3 and the wireless terminal 2 (Yes in S22), the wireless base station 3 determines whether the TCP throughput is smaller than the PHY throughput (S23). In S23, after considering, for example, the amount of time to process the TCP header, the wireless base station 3 may determine whether the value obtained by multiplying the TCP throughput by a header margin is smaller than the value of the PHY throughput.

That is, the header margin represents a margin for the header added between the PHY layer and the TCP layer. Regarding the value of the header margin, a suitable value may be applied for each type of the wireless communication system 1. For example, 1.05 may be used as the value of the header margin.

Here, if it is determined that the TCP throughput is smaller than the PHY throughput (Yes in S23), the wireless base station 3 determines whether it is possible to utilize a code rate or modulation method having higher error resilience (S24). Regarding a modulation and coding scheme (MCS) indicating a combination of an code rate and a modulation method, the wireless base station 3 may determine whether it is possible to utilize an MCS having higher error resilience.

Then, if it is determined that it is possible to utilize an MCS with higher error resilience (Yes in S24), the wireless base station 3 changes the code rate or modulation method for transmission data to the DL to a code rate or modulation method having higher error resilience (S25), thereby reducing the occurrence of wireless errors in the wireless communication path between the wireless base station 3 and the wireless terminal 2.

The operations in the above steps S21 to S25 are repeatedly performed by the wireless base station 3 until it is determined that a wireless error has not occurred in the wireless communication path between the wireless base station 3 and the wireless terminal 2 (No in S22), it is determined that the TCP throughput is greater than or equal to the PHY throughput (No in S23), or it is determined that it is not possible to utilize an code rate or modulation method having higher error resilience (No in S24).

That is, if it is determined that a wireless error has not occurred in the wireless communication path between the wireless base station 3 and the wireless terminal 2 (No in S22), if it is determined that the TCP throughput is greater than or equal to the PHY throughput (No in S23), or if it is determined that it is not possible to utilize an code rate or modulation method having higher error resilience (No in S24), the wireless base station 3 performs control so as to maintain the current MCS (S26) and then the process described above ends (S27).

Here, FIG. 9 depicts an example result of the above process.

As illustrated in FIG. 9, for example, in the initial state, the MCS in the wireless base station 3 is "the modulation method=64 quadrature amplitude modulation (QAM), and the code rate (R)=0.75", the wireless error rate is 20%, the PHY throughput calculated on the basis of the wireless error rate in the DL is 112 Mbps, the delay caused by retransmission that has occurred within a given receiving period of time is 2.24 ms, and the DL TCP throughput is 82.1 Mbps. The code rate (R) indicates the data length before encoding divided by the data length after encoding.

Here, when the wireless base station 3 changes the MCS to be "the modulation method=64 QAM, and R=0.69" in S25, the wireless error rate is changed to 15%, the PHY throughput calculated on the basis of the wireless error rate in the DL changes to 110 Mbps, the delay caused by retransmission that has occurred within the given receiving period of time changes to 1.56 ms, and the DL TCP throughput changes to 92.1 Mbps.

Additionally, upon repeating the above operations, the MCS in the wireless base station 3 is changed to be "the modulation method=64 QAM, and R=0.62", the wireless error rate is changed to 10%, the PHY throughput calculated on the basis of the wireless error rate in the DL changes to 104 Mbps, the delay caused by retransmission that has occurred within a given receiving period of time changes to 0.96 ms, and the DL TCP throughput changes to 103 Mbps. Finally, when the MCS in the wireless base station 3 is "the modulation method=64 QAM, and R=0.54", and the wireless error rate is 0%, the PHY throughput calculated on the basis of the wireless error rate in the DL is 100 Mbps, the delay caused by retransmission that has occurred within the given receiving period of time is 0 ms, and the DL TCP throughput is 100 Mbps.

The wireless terminal 2 may perform data reception processing in accordance with the MCS after a change caused by the above control in the wireless base station 3, by being notified of the MCS after the change. That is, the controller 204 functions as an example of a control unit that controls the reception processing unit 203 and transmission processing unit 205, which serve as an example of a wireless unit, in accordance with the above control in the wireless base station 3.

According to this modification, effects as in the above embodiment may be achieved.

[3] Second Modification

In the first modification described above, the TCP throughput when a wireless error has occurred is sometimes larger than the TCP throughput when the wireless error rate is 0%. In this case, it is desirable that various parameters are controlled so that the TCP throughput is maximum.

Accordingly, in this modification, values of TCP throughputs corresponding to various parameters are calculated, and parameters corresponding to a TCP throughput that is maximum among the calculated TCP throughputs is selected.

Figure 10:
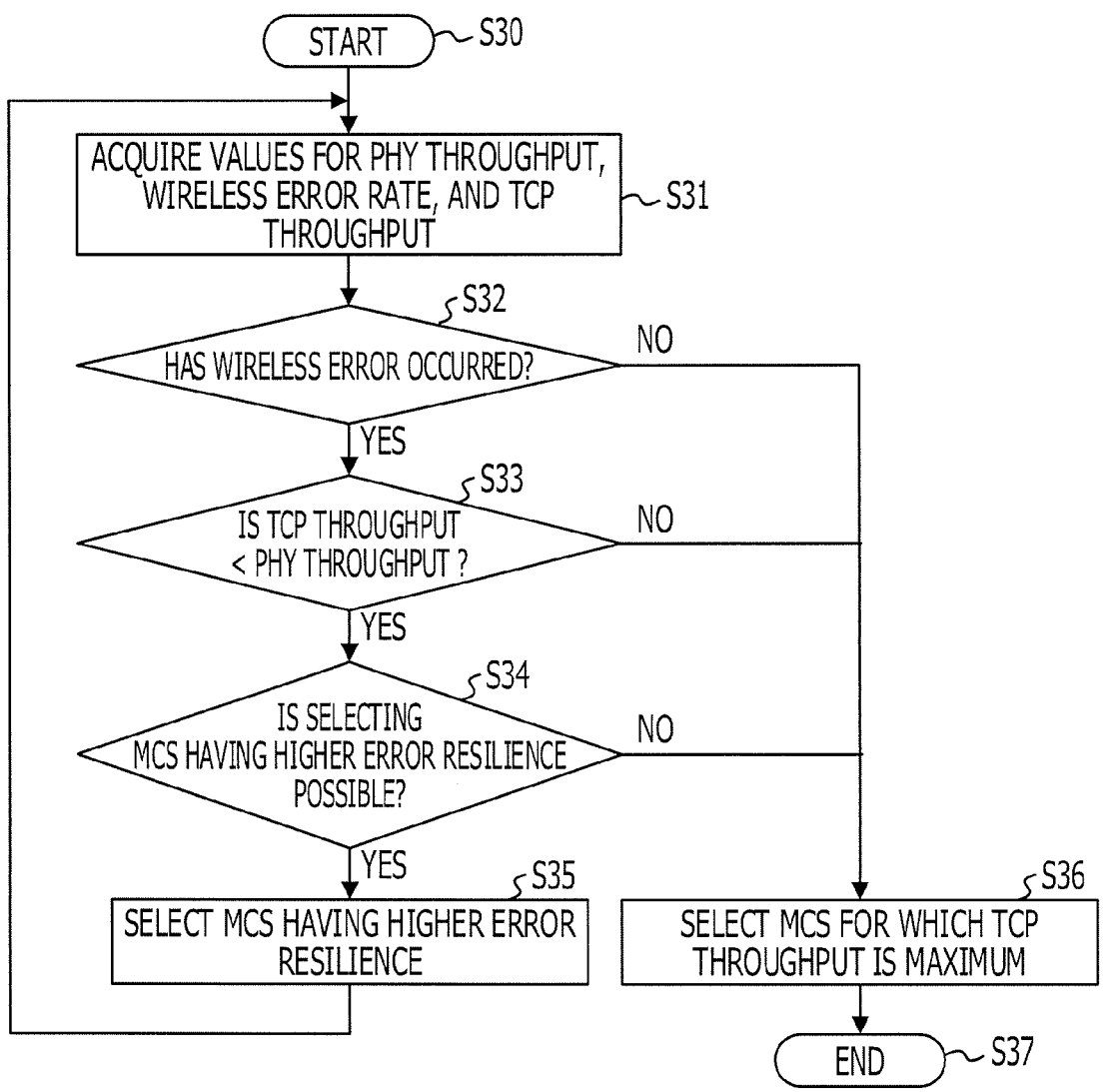
FIG. 10 is a flowchart depicting an example communication control method according to a second modification.

FIG. 10 is a flowchart depicting an example of operations of the wireless communication system 1. Although a process focused on the DL direction will be described by example hereinafter, the process may be practiced similarly for the UL direction.

As illustrated in FIG. 10, upon starting the process at a regular or irregular time (S30), the wireless base station 3 first acquires the values of the DL PHY throughput, the wireless error rate in the DL, and the DL TCP throughput (S31).

Then, the wireless base station 3 determines whether a wireless error has occurred in a wireless communication path between the wireless base station 3 and the wireless terminal 2 (S32). Whether a wireless error has occurred in the wireless communication path between the wireless base station 3 and the wireless terminal 2 may be determined on the basis of the wireless error rate in the DL or the wireless error rate in the UL.

If it is determined that a wireless error has occurred in the wireless communication path between the wireless base station 3 and the wireless terminal 2 (Yes in S32), the wireless base station 3 determines whether the TCP throughput is smaller than the PHY throughput (S33). In S33, after considering, for example, the amount of time to process the TCP header, the wireless base station 3 may determine whether the value obtained by multiplying the TCP throughput by a header margin is smaller than the value of the PHY throughput.

That is, the header margin represents a margin for the header added between the PHY layer and the TCP layer. Regarding the value of the header margin, a suitable value may be applied to each type of the wireless communication system 1. For example, 1.05 may be used as the value of the header margin.

Here, if it is determined that the TCP throughput is smaller than the PHY throughput (Yes in S33), the wireless base station 3 determines whether it is possible to utilize a code rate or modulation method having higher error resilience (S34). The wireless base station 3 may determine whether, regarding an MCS indicating a combination of a code rate and a modulation method, it is possible to utilize an MCS having higher error resilience.

Then, if it is determined that it is possible to utilize an code rate or modulation method having higher error resilience (Yes in S34), the wireless base station 3 changes the code rate or modulation method for data to be transmitted on the DL to an code rate or modulation method having higher error resilience (S35), thereby reducing the occurrence of wireless errors in the wireless communication path between the wireless base station 3 and the wireless terminal 2.

The operations in the above steps S31 to S35 are repeatedly performed by the wireless base station 3 until it is determined that a wireless error has not occurred in the wireless communication path between the wireless base station 3 and the wireless terminal 2 (No in S32), it is determined that the TCP throughput is greater than or equal to the PHY throughput (No in S33), or it is determined that it is not possible to utilize an code rate or modulation method having higher error resilience (No in S34).

Here, if it is determined that a wireless error has not occurred in the wireless communication path between the wireless base station 3 and the wireless terminal 2 (No in S32), if it is determined that the TCP throughput is greater than or equal to the PHY throughput (No in S33), or if it is determined that it is not possible to utilize an code rate or modulation method having higher error resilience (No in S34), the wireless base station 3 selects an code rate and modulation method with which the TCP throughput is maximum (S36) and then the process ends (S37).

That is, in this modification, control to change various parameters is performed so that the TCP throughput is maximum. Therefore, in some cases, various parameters are changed such that the wireless error rate increases, for example.

As described above, according to this modification, the TCP throughput may be reliably maximized.

[4] Third Modification

Additionally, for example, the process according to the embodiment and the process according to the first modification described above may be carried out in combination.

Figure 11:
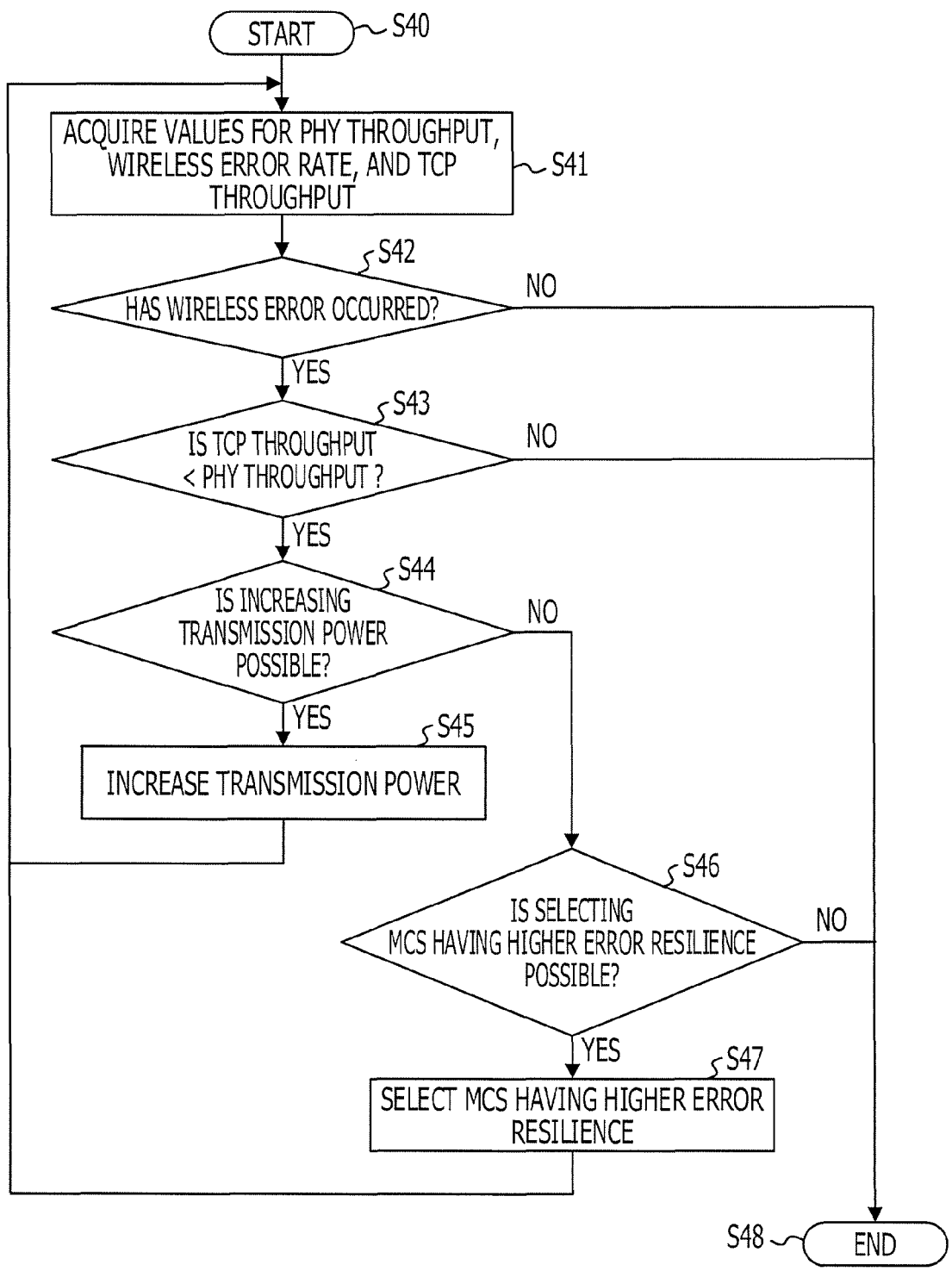
FIG. 11 is a flowchart depicting an example communication control method according to a third modification.

FIG. 11 is a flowchart depicting an example of operations of the wireless communication system 1. Note that although a process focused on the DL direction will be described by example hereinafter, the process may be practiced similarly for the UL direction.

As illustrated in FIG. 11, upon starting the process at a regular or irregular time (S40), the wireless base station 3 first acquires the values of the DL PHY throughput, the wireless error rate in the DL, and the DL TCP throughput (S41).

Then, the wireless base station 3 determines whether a wireless error has occurred in a wireless communication path between the wireless base station 3 and the wireless terminal 2 (S42). Note that whether a wireless error has occurred in the wireless communication path between the wireless base station 3 and the wireless terminal 2 may be determined on the basis of the wireless error rate in the DL or the wireless error rate in the UL.

If it is determined that a wireless error has occurred in the wireless communication path between the wireless base station 3 and the wireless terminal 2 (Yes in S42), the wireless base station 3 determines whether the TCP throughput is smaller than the PHY throughput (S43). In S43, after considering, for example, the amount of time to process the TCP header, the wireless base station 3 may determine whether the value obtained by multiplying the TCP throughput by a header margin is smaller than the value of the PHY throughput.

That is, the header margin represents a margin for the header added between the PHY layer and the TCP layer. Regarding the value of the header margin, a suitable value may be applied to each type of the wireless communication system 1. For example, 1.05 may be used as the value of the header margin.

Here, if it is determined that the TCP throughput is smaller than the PHY throughput (Yes in S43), the wireless base station 3 determines whether it is possible to increase the transmission power of the wireless base station 3 (S44).

Then, if it is determined that it is possible to increase the transmission power of the wireless base station 3 (Yes in S44), the wireless base station 3 controls the transmission power of the wireless base station 3 so that the transmission power increases (S45), thereby reducing the occurrence of wireless errors in the wireless communication path between the wireless base station 3 and the wireless terminal 2.

The operations in the above steps S41 to S45 are repeatedly performed by the wireless base station 3 until it is determined that a wireless error has not occurred in the wireless communication path between the wireless base station 3 and the wireless terminal 2 (No in S42), it is determined that the TCP throughput is greater than or equal to the PHY throughput (No in S43), or it is determined that resources are tight and increasing the transmission power of the wireless base station 3 is not possible (No in S44).

Here, if it is determined that a wireless error has not occurred in the wireless communication path between the wireless base station 3 and the wireless terminal 2 (No in S42), or it is determined that the TCP throughput is greater than or equal to the PHY throughput (No in S43), the above process ends (S48).

Otherwise, if it is determined that resources are tight and increasing the transmission power of the wireless base station 3 is impossible (No in S44), the wireless base station 3 determines whether it is possible to utilize an code rate or modulation method having higher error resilience (S46). The wireless base station 3 may determine whether, for an MCS indicating a combination of a code rate and a modulation method, it is possible to utilize an MCS having higher error resilience.

Then, if it is determined that it is possible to utilize an code rate or modulation method having higher error resilience (Yes in S46), the wireless base station 3 changes the code rate or modulation method for transmission data to the DL to an code rate and modulation method having higher error resilience (S47), thereby reducing the occurrence of wireless errors in the wireless communication path between the wireless base station 3 and the wireless terminal 2.

The operations in the above steps S46 to S47 are repeatedly performed by the wireless base station 3 until it is determined that a wireless error has not occurred in the wireless communication path between the wireless base station 3 and the wireless terminal 2 (No in S42), it is determined that the TCP throughput is greater than or equal to the PHY throughput (No in S43), or it is determined that it is not possible to utilize an code rate or modulation method having higher error resilience (No in S46).

That is, if it is determined that a wireless error has not occurred in the wireless communication path between the wireless base station 3 and the wireless terminal 2 (No in S42), if it is determined that the TCP throughput is greater than or equal to the PHY throughput (No in S43), or if it is determined that it is not possible to utilize an code rate or modulation method having higher error resilience (No in S46), the process ends (S48).

According to this modification, effects as in the above embodiment may be achieved.

Additionally, for example, the process according to the embodiment and the process according to the second modification described above may be carried out in combination.

In this case, the wireless base station 3 may select transmission power, a code rate, and a modulation method with which the TCP throughput is maximum, instead of the above operation of S48. Thus, the TCP throughput may be reliably maximized.

[5] Fourth Modification

In the embodiment and modifications described above, the wireless base station 3 calculates the TCP throughput on the basis of the amount of information for a layer 3 signal, which is made up from IP packets that have been successfully demodulated or the like, and the amount of time to transmit or send the layer 3 signal. However, the TCP throughput may be computed on the basis of the RTT for the upper network and the RTT for the wireless side.

Accordingly, in this modification, a wireless base station 3' measures the RTT between the wireless base station 3' and the contents server 7 in the upper network by performing response request signaling, such as ping, with the upper network, and calculates the RTT between the wireless base station 3' and the wireless terminal 2 on the basis of the wireless error rate, the retransmission delay, and so forth. Then, the wireless base station 3' computes TCP throughput on the basis of the above measurement result, the above calculation result, and equation (1) mentioned above.

Figure 12:
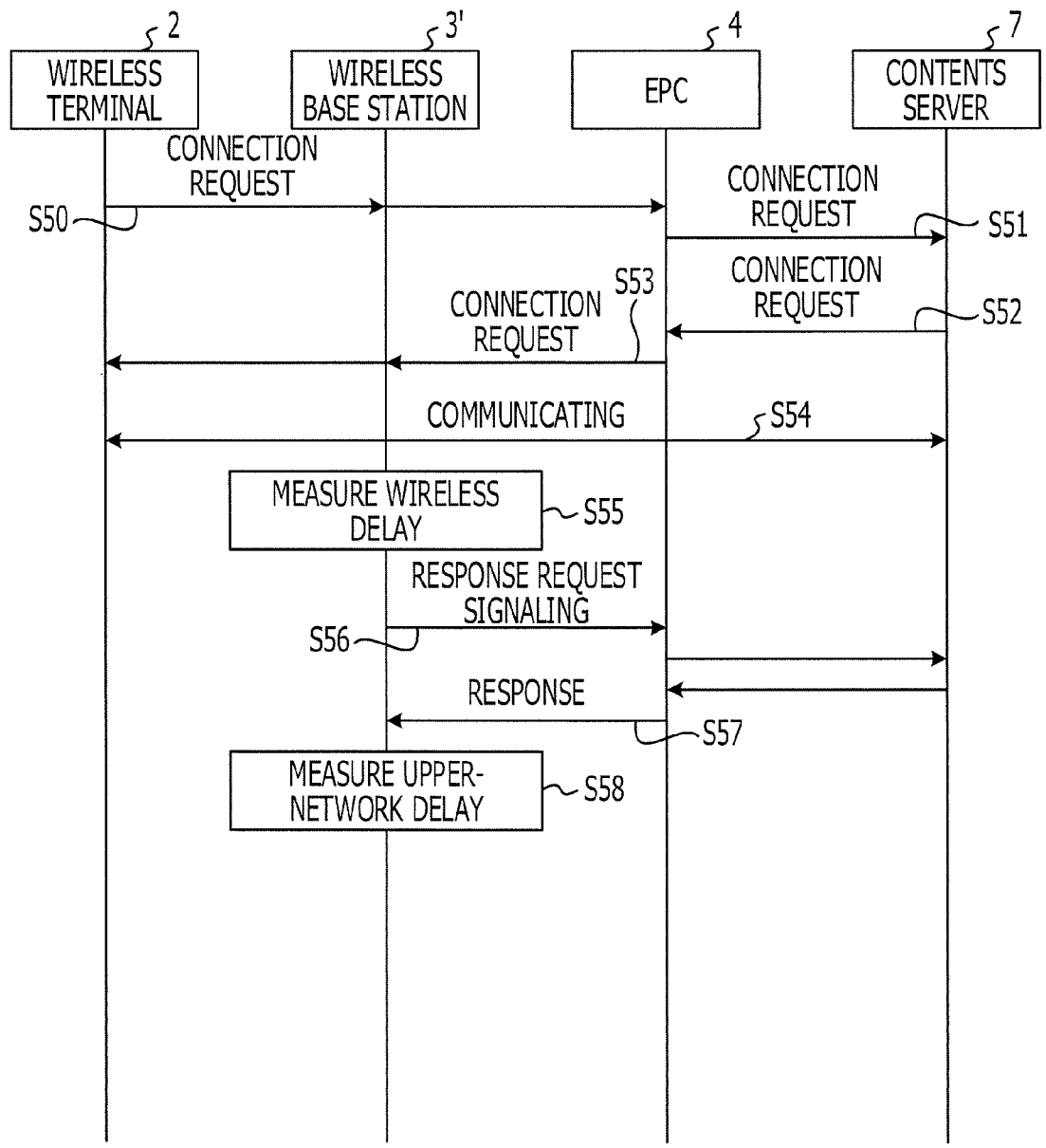
FIG. 12 depicts an example communication control method according to a fourth modification.

An example communication control method according to the modification is illustrated in FIG. 12.

As illustrated in FIG. 12, first, when a connection request is transmitted from the wireless terminal 2 to the wireless base station 3' (S50), the wireless base station 3' transfers the connection request to an EPC 4.

The EPC 4 then transmits, to the contents server 7, the connection request transferred from the wireless base station 3' (S51). Upon receipt of the connection request, the contents server 7 returns a response to the connection request (connection request response) (S52).

The EPC 4 receives the connection request response from the contents server 7, and transfers the received connection request response to the wireless base station 3' (S53).

The connection request response is transferred to the wireless terminal 2 by the wireless base station 3', and thereby a communication path is established between the wireless terminal 2 and the contents server 7, which enables communication between the wireless terminal 2 and the contents server 7 (S54).

Next, the wireless base station 3' calculates the delay on the wireless side, for example, on the basis of the following expression (2) (S55).

$$\text{Wireless delay} = \text{Base} + \sum_k P^k(1-P)(kD) \quad (2)$$

Here, "Base" indicates the RTT in a situation where a wireless error has not occurred, "P" indicates the wireless error rate, and "D" indicates the transfer delay caused by the retransmission of data. When the wireless communication system 1 adopts an LTE method, for example, Base=4 ms and D=8 ms.

In this way, the delay in the wireless propagation path between the wireless base station 3' and the wireless terminal 2 is determined in accordance with the wireless error rate. For example, when it is assumed that the wireless terminal 2 fully occupies the network, the relationship illustrated in the table of FIG. 13 is derived.

Additionally, the wireless base station 3' carries out response request signaling through the EPC 4 to the contents server 7 (S56).

The contents server 7 returns a response in accordance with a request from the wireless base station 3' (S57).

The wireless base station 3' calculates the RTT on the upper network on the basis of a time point at which response request signaling is carried out in S56 mentioned above and a time point at which a response is received through the EPC 4 from the contents server 7 (S58). Note that either of the operation in the above S55 and the operations in the above steps S56 to S58 may be performed earlier after communication between the wireless terminal 2 and the contents server 7 has been established.

Thus, on the basis of the RTT on the upper network and the wireless RTT, the wireless base station 3' may compute the TCP throughput by the following equation (1)'.

Upper limit of TCP throughput [Mbps]=window size [kB]×8/(upper network RTT+wireless RTT)[ms]   (1)'

Figure 14:
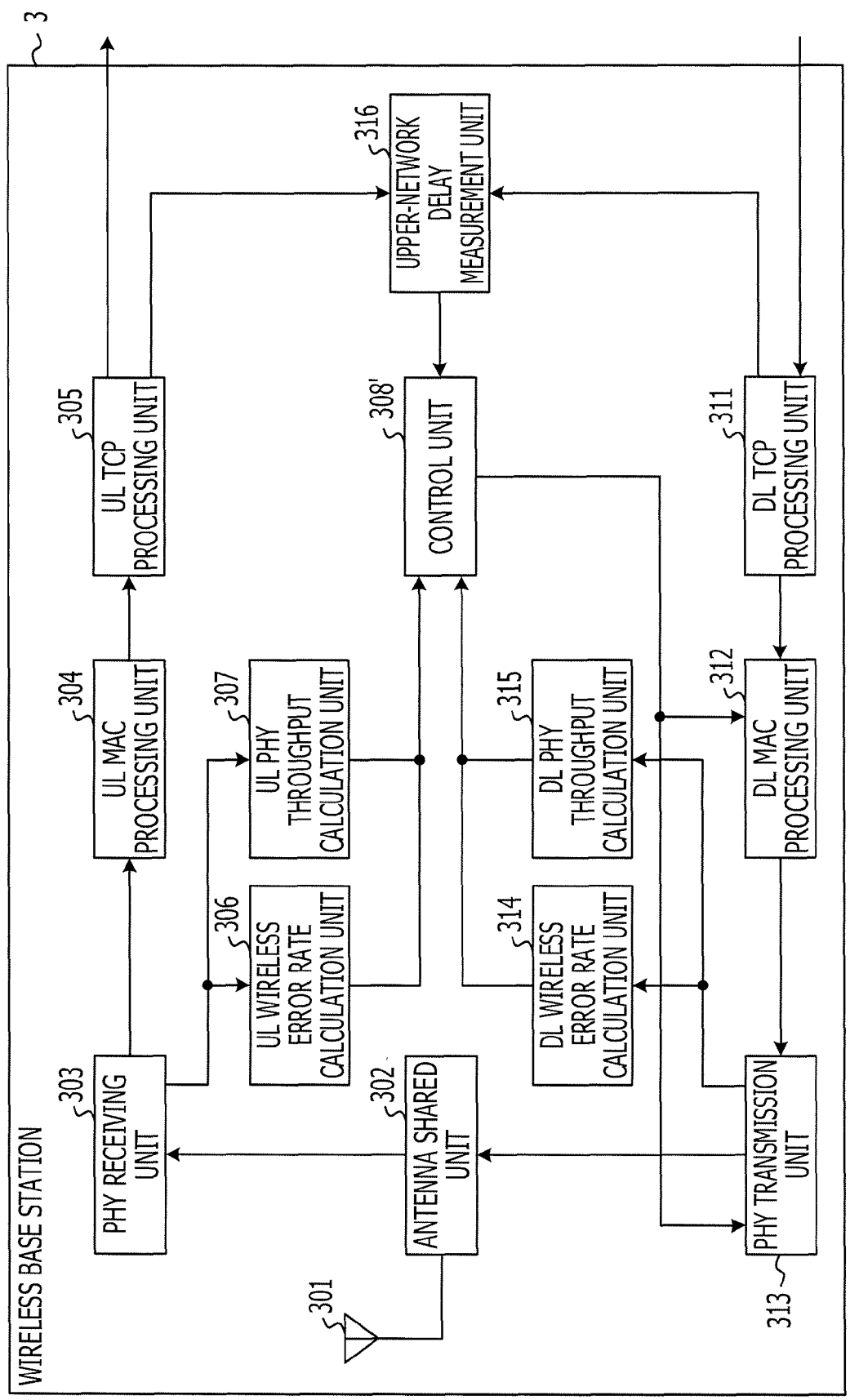
FIG. 14 is a diagram depicting an example configuration of a wireless base station according to the fourth modification.

Here, FIG. 14 depicts an example configuration of the wireless base station 3'.

The wireless base station 3' depicted in FIG. 14 includes, for example, the antenna 301, the antenna sharing unit 302, the PHY receiving unit 303, the UL MAC processing unit 304, the UL TCP processing unit 305, the UL wireless error rate calculation unit 306, the UL PHY throughput calculation unit 307, and a control unit 308'. Additionally, the wireless base station 3' depicted in FIG. 14 includes, for example, the DL TCP processing unit 311, the DL MAC processing unit 312, the PHY transmission unit 313, the wireless error rate calculation unit 314, the DL PHY throughput calculation unit 315, and an upper-network-side delay measurement unit 316. Elements denoted in FIG. 13 by the same references as in FIG. 5 have the same functions as those depicted in FIG. 5, and the description thereof is omitted.

Here, as described above with reference to FIG. 12, the upper-network-side delay measurement unit 316 has a function of carrying out response request signaling with respect to the contents server 7 in order to measure the upper network RTT. The upper network delay measurement unit 316 calculates the RTT on the upper network on the basis of a time point at which the above response request signaling is carried out and a time point at which a response to the signaling is received from the contents server 7. The control unit 308' is notified of the upper network RU, which is calculated by the upper network delay measurement unit 316.

The control unit 308' has a function of managing the wireless terminal 2 that wirelessly communicates with the wireless base station 3'.

The control unit 308' is capable of performing control so as to change various parameters with respect to: transmission power, the encoding scheme for UL radio signals, and a method for modulating UL radio signals in the wireless terminal 2, as well as transmission power, the encoding scheme of DL radio signals, and the method for modulating DL radio signals in the wireless base station 3. The transmission power, the encoding scheme of UL radio signals, and the method for modulation of UL radio signals in the wireless terminal 2 may be changed by sending a control signal to the wireless terminal 2.

Moreover, the control unit 308' is capable of performing control so as to change the above various parameters on the basis of information sent from the UL wireless error rate calculation unit 306, the UL PHY throughput calculation unit 307, the DL wireless error rate calculation unit 314, the DL PHY throughput calculation unit 315, and the upper-network-side delay measurement unit 316.

Additionally, the control unit 308' may calculate the wireless delay on the basis of the above expression (2).

Thus, the control unit 308' may compute the DL TCP throughput and the UL TCP throughput by the above equation (1)' on the basis of the upper network RTT and the wireless RTT.

That is, the control unit 308' may function as an example of a calculation unit that calculates the throughput at the upper layer on the basis of the round trip time between the wireless base station 3' and the wireless terminal 2 and the round trip time between the base station 3' and a communication partner 7 of the wireless terminal 2.

Figure 15:
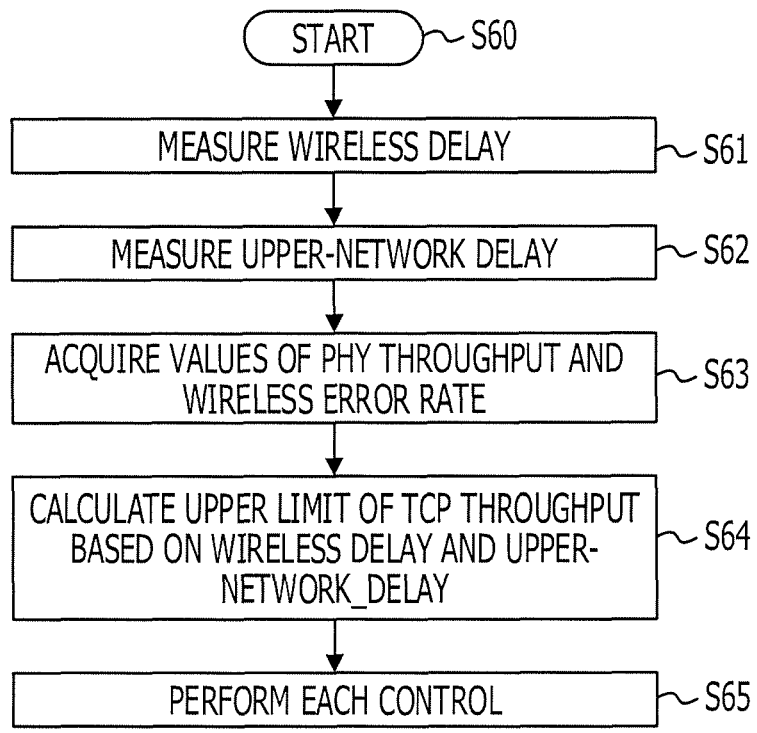
FIG. 15 is a flowchart depicting an example communication control method according to the fourth modification.

FIG. 15 is a flowchart depicting an example of operations of the wireless communication system 1. Note that although a process focused on the DL direction will be described by example hereinafter, the process may be practiced similarly for the UL direction.

As illustrated in FIG. 15, upon starting the process at a regular or irregular time (S60), the wireless base station 3' first calculates the wireless RU using the above equation (2) (S61).

Then, the wireless base station 3' carries out response request signaling and receives a response to the signaling, thereby measuring the RU on the upper network (S62).

Next, the wireless base station 3' acquires the values of the DL PHY throughput and the wireless error rate in the DL (S63).

Then, given that the sum of the wireless RTT calculated in the above S61 and the upper network RTT measured in the above S62 is treated as the RTT between the wireless terminal 2 and the contents server 7, the wireless base station 3' computes the upper limit of the DL TCP throughput using the above equation (1)' (S64).

Then, the wireless base station 3' performs control that has been described with reference to FIG. 6, FIG. 8, FIG. 10, and FIG. 11 using the values acquired in the above steps 63 and 64 (S65).

According to this modification, effects as in the above embodiment may be achieved, and, additionally, the TCP throughput may be obtained from computation. This enables the configuration of the wireless base station 3' to be simplified.

[6] Example of Hardware Configuration

Figure 16:
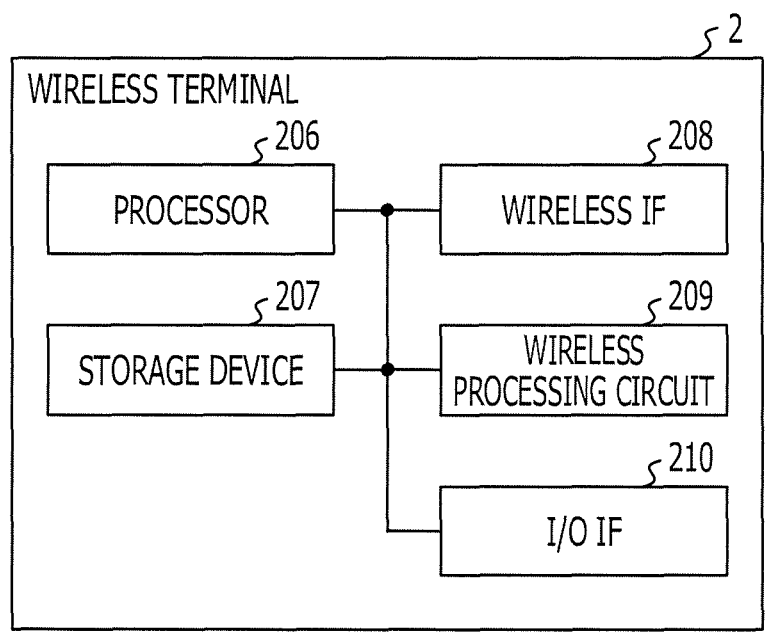
FIG. 16 is a diagram depicting an example hardware configuration of a wireless terminal.

Here, FIG. 16 depicts an example of a hardware configuration of the wireless terminal 2.

As illustrated in FIG. 16, the wireless terminal 2 includes, for example, a processor 206, a storage device 207, a wireless interface (IF) 208, a wireless processing circuit 209, and an input/output (I/O) interface (IF) 210.

The processor 206 is a device that processes data. Examples of the processor 206 include a central processing unit (CPU), a digital signal processor (DSP), a large scale integration (LSI), and a field programmable gate array (FPGA).

The storage device 207 is a device that stores data. Examples of the storage device 207 include a read-only memory (ROM), a random access memory (RAM), a magnetic disk, an optical disk, and a flash memory.

The wireless IF 208 is an interface device for wirelessly communicating with the wireless base station 3 or 3'.

The wireless processing circuit 209 is a circuit that performs processing such as low-noise amplification, frequency conversion to baseband frequency (down conversion), and A/D conversion for radio signals received by the wireless IF 208, as well as processing such as D/A conversion of transmission data, frequency conversion to wireless frequency (up conversion), and power amplification for radio signals to be transmitted by the wireless IF 208.

The input/output IF 210 is a device that performs input and output, and includes operation buttons and a microphone, for example, which are input interfaces, as well as a display and a speaker, for example, which are output interfaces.

The relationship between each configuration component of the wireless terminal 2 illustrated in FIG. 4 and each configuration component of the wireless terminal 2 illustrated in FIG. 16 is as described hereinafter, for example.

The wireless IF 208 corresponds to the antenna 201 and the antenna sharing unit 202, for example; the wireless processing circuit 209 corresponds to the reception processing unit 203 and the transmission processing unit 205, for example; and the processor 206 and the storage device 207 correspond to the control unit 204, for example.

Figure 17:
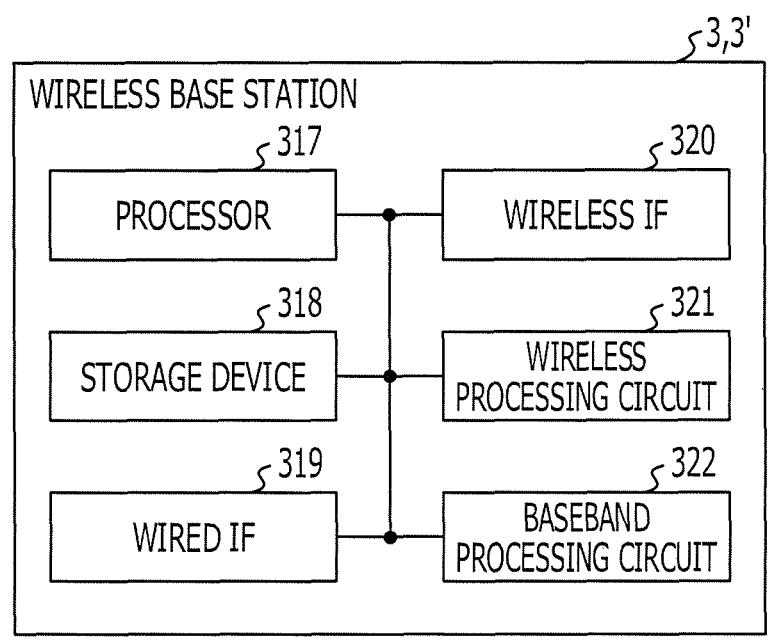
FIG. 17 is a diagram depicting an example hardware configuration of a wireless base station.

FIG. 17 depicts an example of a hardware configuration of the wireless base station 3 or 3'.

As illustrated in FIG. 17, the wireless base station 3 or 3' includes, for example, a processor 317, a storage device 318, a wired interface (IF) 319, a wireless IF 320, a wireless processing circuit 321, and a baseband processing circuit 322.

The processor 317 is a device that processes data. Examples of the processor 317 include a CPU, a DSP, an LSI, and an FPGA.

The storage device 318 is a device that stores data. Examples of the storage device 318 include a ROM, a RAM, a magnetic disk, an optical disk, and a flash memory.

The wired IF 319 is an interface device for performing wired communication with the EPC 4 and an upper network (for example, a so-called backhaul network).

The wireless IF 320 is an interface device for wirelessly communicating with the wireless terminal 2.

The wireless processing circuit 321 is a circuit that performs processing such as low-noise amplification, frequency conversion to baseband frequency (down conversion), and A/D conversion for radio signals received by the wireless IF 320, as well as processing such as D/A conversion of transmission data, frequency conversion to wireless frequency (up conversion), and power amplification for radio signals transmitted by the wireless IF 320.

The baseband processing circuit 322 is a circuit that performs given baseband processing on radio signals received by the wireless IF 320. Examples of the baseband processing circuit 322 include a DSP and an FPGA.

The relationship between each configuration component of the wireless base station 3 illustrated in FIG. 5 and each configuration component of the wireless base station 3 illustrated in FIG. 17 is as described hereinafter, for example.

The wireless IF 320 corresponds to the antenna 301 and the antenna sharing unit 302, for example; the wireless processing circuit 321 corresponds to the PHY receiving unit 303 and the PHY transmission unit 313, for example; and the wired IF 319 corresponds to the UL TCP processing unit 305 and the DL TCP processing unit 311, for example.

Additionally, the processor 317, the storage device 318 and the baseband processing circuit 322 correspond to the UL MAC processing unit 304, the UL TCP processing unit 305, the UL wireless error rate calculation unit 306, the UL PHY throughput calculation unit 307, the control unit 308, the UL TCP throughput calculation unit 309, the DL TCP throughput calculation unit 310, the DL TCP processing unit 311, the DL MAC processing unit 312, the wireless error rate calculation unit 314, and the DL PHY throughput calculation unit 315, for example.

The relationship between each configuration component of the wireless base station 3' illustrated in FIG. 14 and each configuration component of the wireless base station 3' illustrated in FIG. 17 is as described hereinafter, for example.

The wireless IF 320 corresponds to the antenna 301 and the antenna sharing unit 302, for example; the wireless processing circuit 321 corresponds to the PHY receiving unit 303 and the PHY transmission unit 313, for example; and the wired IF 319 corresponds to the UL TCP processing unit 305 and the DL TCP processing unit 311, for example.

Additionally, the processor 317, the storage device 318, and the baseband processing circuit 322 correspond to the UL MAC processing unit 304, the UL TCP processing unit 305, the UL wireless error rate calculation unit 306, the UL PHY throughput calculation unit 307, the control unit 308', the DL TCP throughput calculation unit 316, the DL TCP processing unit 311, the DL MAC processing unit 312, the wireless error rate calculation unit 314, and the DL PHY throughput calculation unit 315, for example.

[7] Miscellanea

Each configuration and each function of the wireless terminal 2 and the wireless base station 3 or 3' in the above embodiment may be suitably selected in accordance with the situation and may also be used in combination as appropriate. That is, in order to exert functions of the present disclosure, each configuration and each function may be suitably selected and may also be used in combination as appropriate.

For example, although a process focused on the DL direction has been described by example in the embodiment and modifications described above, the process may be practiced similarly for the UL direction.

Additionally, the wireless terminal 2 may have the functions of the UL wireless error rate calculation unit 306, the UL PHY throughput calculation unit 307, the control units 308 and 308', the UL TCP throughput calculation unit 309, the DL TCP throughput calculation unit 310, the wireless error rate calculation unit 314, and the DL PHY throughput calculation unit 315 of the wireless base station 3 or 3'.

Moreover, although the method for suppressing a reduction in the throughput at the TCP layer, which is an example upper layer, has been described in the embodiment and modifications described above, the upper layer includes, for example, a layer at which control for retransmission of data between the wireless base station 3 or 3' and the wireless base terminal 2 is managed.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A wireless communication system comprising:
   a terminal; and
   a base station including
      an antenna configured to perform wireless communication with the terminal, and
      a processor configured to perform, when a first throughput at a radio layer for the wireless communication is larger than a second throughput at an upper layer to the radio layer for the wireless communication due to retransmission control at the radio layer, a processing to decrease errors at the radio layer for the wireless communication.

2. The wireless communication system according to claim 1, wherein the first throughput is calculated based on an error rate at the radio layer for the wireless communication.

3. The wireless communication system according to claim 1, wherein the processing includes control for increasing transmission power for the wireless communication.

4. The wireless communication system according to claim 1, wherein the processing includes control for decreasing a code rate for the wireless communication.

5. The wireless communication system according to claim 1, wherein the processing includes control for decreasing a degree of a modulation for the wireless communication.

6. The wireless communication system according to claim 1, wherein the processor is further configured to optimize the second throughput.

7. The wireless communication system according to claim 1, wherein the second throughput is calculated based on a first round trip time between the terminal and the base station and a second round trip time between the terminal and an upper apparatus to the base station.

8. A base station comprising:
   an antenna configured to perform wireless communication with the terminal; and
   a processor configured to perform, when a first throughput at a radio layer for the wireless communication is larger than a second throughput at an upper layer to the radio layer for the wireless communication due to retransmission control at the radio layer, a processing to decrease errors at the radio layer for the wireless communication.

9. A wireless communication method comprising:
   performing by a base station, wireless communication with the terminal; and
   performing by the base station, when a first throughput at a radio layer for the wireless communication is larger than a second throughput at an upper layer to the radio layer for the wireless communication due to retransmission control at the radio layer, a processing to decrease errors at the radio layer for the wireless communication.

10. The wireless communication system according to claim 1, wherein the processing further includes changing at least one of a code rate of data and a modulation method between the terminal and the base station.

11. The wireless communication system according to claim 1, wherein the second throughput comprises a transmission control protocol (TCP) throughput.

12. The wireless communication system according to claim 7, wherein the first round trip time between the terminal and the base station is based at least in part on a wireless error rate or a retransmission delay.

13. The wireless communication system according to claim 7, wherein the second round trip between the terminal and the upper apparatus is based on at least one or more response request signaling messages with an upper network.

14. The wireless communication system according to claim 1, wherein the first throughput is larger than the second throughput due to retransmission time out of the retransmission control.

* * * * *